(12) United States Patent
Hautamäki et al.

(10) Patent No.: US 11,471,890 B2
(45) Date of Patent: Oct. 18, 2022

(54) RECEPTACLE HOLDER AND RECEPTACLE RACK

(71) Applicant: Thermo Fisher Scientific Oy, Vantaa (FI)

(72) Inventors: Mika Hautamäki, Vantaa (FI); Sami Paavilainen, Vantaa (FI)

(73) Assignee: Thermo Fisher Scientific Oy, Vantaa (FI)

( * ) Notice: Subject to any disclaimer, the term of this patent is extended or adjusted under 35 U.S.C. 154(b) by 450 days.

(21) Appl. No.: 16/612,772

(22) PCT Filed: Apr. 26, 2018

(86) PCT No.: PCT/FI2018/050306
§ 371 (c)(1),
(2) Date: Nov. 12, 2019

(87) PCT Pub. No.: WO2018/206841
PCT Pub. Date: Nov. 15, 2018

(65) Prior Publication Data
US 2020/0147616 A1    May 14, 2020

(30) Foreign Application Priority Data
May 12, 2017   (FI) ..................... 20175431

(51) Int. Cl.
*B01L 9/06* (2006.01)
*G01N 35/02* (2006.01)
*G01N 35/04* (2006.01)

(52) U.S. Cl.
CPC .............. *B01L 9/06* (2013.01); *G01N 35/026* (2013.01); *B01L 2200/023* (2013.01)

(58) Field of Classification Search
CPC .... B01L 9/06; B01L 2200/023; G01N 35/026
See application file for complete search history.

(56) References Cited

U.S. PATENT DOCUMENTS

| | | |
|---|---|---|
| 5,137,693 A | 8/1992 | Mawhirt |
| 5,651,941 A | 7/1997 | Stark et al. |
| 6,156,275 A | 12/2000 | Dumitrescu et al. |
| 6,274,092 B1 | 8/2001 | Itoh |
| 2004/0195193 A1 | 10/2004 | Jafari et al. |

(Continued)

FOREIGN PATENT DOCUMENTS

| | | |
|---|---|---|
| CN | 1991328 A | 7/2007 |
| CN | 202264971 U | 6/2012 |
| CN | 204799312 U | 11/2015 |

(Continued)

*Primary Examiner* — Christopher Adam Hixson
(74) *Attorney, Agent, or Firm* — Laine IP Oy (57) ABSTRACT

A receptacle holder having a base body, a first perimeter wall which at least partially protrudes from the base body, and a plurality of resilient elements, which are distributed about a first axis of the receptacle holder and are detachably connected with the first perimeter wall, and wherein each resilient element comprises a first end portion and a second end portion, and wherein each second end portion rests hooked over an edge of a portion of the first perimeter wall, and wherein the receptacle holder is configured to allow sliding of each second end portion in a direction perpendicular to the first axis.

10 Claims, 9 Drawing Sheets

(56) References Cited

U.S. PATENT DOCUMENTS

2015/0101911 A1  4/2015  Friedman

FOREIGN PATENT DOCUMENTS

| | | | |
|---|---|---|---|
| EP | 0467301 | A2 * | 1/1992 |
| EP | 1518605 | A2 | 3/2005 |
| EP | 2098296 | A1 | 9/2009 |
| EP | 3093071 | A1 | 11/2016 |
| EP | 3136109 | A1 | 3/2017 |
| EP | 3211426 | A1 | 8/2017 |
| GB | 2419408 | A | 4/2006 |
| JP | 433251 | B2 | 9/2009 |

* cited by examiner

RECEPTACLE HOLDER AND RECEPTACLE RACK

FIELD

The present invention relates to a receptacle holder. Further, the present invention relates to a receptacle rack.

BACKGROUND

A wide variety of automated laboratory systems are known in the art and widely used in hospitals, clinics, and research laboratories. A laboratory automation system typically comprises a number of stations, in which samples, for example blood, saliva, swap, and other target substances are processed. The device complex may comprise a plurality of separate devices such as a sample analyzer, a conveyor system, a receptacle terminal, and a sample storage, for instance. For example, in sample analyzers, which analyze target substances contained in a sample, typically so called sample tubes, test tubes, cuvettes or other elongate receptacles are used for temporarily storing the target substance. The sample tubes, test tubes, cuvettes, sample containers, sample vessels, or other elongate receptacles, in the following only referred to as "receptacles", can be e.g. placed in so called receptacle holders. Each receptacle holder can support one receptacle.

Further, one single device may comprise multiple receptacle holders in order to form a single support for a plurality of receptacles. Such a device may be e.g. used for handling at least one receptacle, typically a plurality of receptacles, and may be called rack, carrier, magazine, test tube rack, sample tube rack, tube tray, sample tube keeper, sample tube carrier, or the like. In the following said device is only referred to as "receptacle rack". The receptacle racks are used to hold at least one receptacle upright, typically to hold multiple receptacles upright at the same time.

In laboratory automation systems different kinds of receptacles, in particular receptacles having different dimensions, for example different diameter, are handled. The transport of the receptacles and/or a treatment of the sample contained in a respective receptacle may be controlled by means of a bar code provided on an outside surface of the receptacles.

For example, document U.S. Pat. No. 5,651,941 A describes a self-adjusting linkable holder for receptacles comprising a longitudinally symmetrical vertically oriented polygonal body having two pairs of orthogonally disposed opposed vertical faces and a horizontal bottom sliding surface. The top surface of the body is provided with a central bore opening into a vertical cavity adapted to releasably receive and retain a wide variety of receptacle configurations in a stable vertical orientation. Machine readable indicia may be provided on the external surface and vertical slots are provided in each external face to provide access to the central vertical cavity. A releasably locking horizontally aligned dovetail feature is provided to link adjacent holders into conveniently handled racks or magazines which may be assembled and disassembled by machine. Additional horizontally sliding indexing elements are provided to facilitate the stable storage and transport of the rack.

Document EP 3093071 A1 further discloses a receptacle holder for transporting a receptacle in a laboratory automation system. The holder comprises a base body and at least three centering fingers attached to the base body, wherein the centering fingers are distributed about a central axis, wherein each centering finger comprises an elongate, bent resilient element and a strut having a higher stiffness than the resilient element, wherein the struts extend in parallel to the central axis, and wherein a first end of the associated resilient element is fixedly attached to the strut at an upper position of and a second end of the resilient element contacts the strut at a lower position between the base body and the upper position. The invention further relates to a laboratory distribution system having a number of receptacle holders, and a laboratory automation system comprising a laboratory distribution system.

In view of the foregoing, it would be beneficial to provide a receptacle holder and a receptacle rack for transporting receptacles in a laboratory automation system or a part thereof, which holder and rack are both configured to allow a secure support of different kinds of receptacles.

SUMMARY OF THE INVENTION

The invention is defined by the features of the independent claims. Some specific embodiments are defined in the dependent claims.

According to a first aspect of the present invention, there is provided a receptacle holder comprising a base body, a first perimeter wall which at least partially protrudes from the base body, and a plurality of bent resilient elements, which are distributed about a first axis of the receptacle holder and are detachably connected with the first perimeter wall, and wherein each resilient element comprises a first end portion and a second end portion, and wherein each second end portion rests hooked over an edge of a portion of the first perimeter wall, and wherein the receptacle holder is configured to allow sliding of each second end portion in a direction perpendicular to the first axis.

Various embodiments of the first aspect may comprise at least one feature from the following bulleted list:

- each first end portion is arranged in a separate indentation of the first perimeter wall
- the receptacle holder is configured to allow sliding of each second end portion in the direction perpendicular to the first axis responsive to an receptacle being inserted into the receptacle holder
- the receptacle holder is configured to allow sliding of each second end portion away from the first axis
- the receptacle holder is configured to allow sliding of each second end portion away from the edge of the first perimeter wall
- the receptacle holder is configured to allow sliding of each second end portion in the direction perpendicular to the first axis responsive to an receptacle being removed from the receptacle holder
- the receptacle holder is configured to allow sliding of each second end portion towards the first axis
- the receptacle holder is configured to allow sliding of each second end portion towards the edge of the first perimeter wall
- the receptacle holder comprises four resilient elements
- the first perimeter wall provides a first octagonal opening
- the first end portion of each resilient element is connected to the first perimeter wall at a lower position and the second end portion of each resilient element is connected to the first perimeter wall at an upper position
- each resilient element is formed of metal, formed of metal band, or formed of plastic material
- the resilient metal band is formed to form a substantially C-shaped-member having a base extending at least partially in parallel to the first axis the C-shaped-member comprises a first leg extending from the base, and wherein the first end portion in turn projects from the first leg the C-shaped-member comprises a second leg extending from the base, and wherein the second end portion in turn projects from the second leg the first leg is arranged substantially parallel to the second leg the base is bent to form at least two distinct contact portions for contacting an inserted receptacle Various embodiments of the second aspect may comprise at least one feature from the following bulleted list:

the receptacle rack comprises four adjoining receptacle holders, which are arranged such that a second perimeter wall is provided by portions of the first perimeter wall of each of said four adjoining receptacle holders a cavity having a second axis is provided between said four adjoining receptacle holders the second axis is arranged parallel to the first axis the receptacle rack is configured to allow sliding of the second end portion of one resilient element of each of said four adjoining receptacle holders in the direction perpendicular to the second axis responsive to receptacles being inserted into each of said four adjoining receptacle holders the receptacle rack is configured to allow sliding of the second end portion of one resilient element of each of said four adjoining receptacle holders towards the second axis the receptacle holder is configured to allow sliding of the second end portion of one resilient element of each of said four adjoining receptacle holders inwardly of the second perimeter wall the receptacle rack is configured to allow sliding of the second end portion of one resilient element of each of said four adjoining receptacle holders in the direction perpendicular to the second axis responsive to receptacles being removed from each of said four adjoining receptacle holders the receptacle rack is configured to allow sliding of the second end portion of one resilient element of each of said four adjoining receptacle holders away from the second axis the receptacle holder is configured to allow sliding of the second end portion of one resilient element of each of said four adjoining receptacle holders towards the second perimeter wall the second perimeter wall provides a second octagonal opening Considerable advantages are obtained by certain embodiments of the invention. A receptacle holder and a receptacle rack are provided. The receptacle holder is configured to allow sliding of the second end portions of each resilient element in a direction perpendicular to the first axis responsive to a receptacle being inserted into the receptacle holder. Thus, secure insertion of a receptacle into the receptacle holder can be improved due to the sliding motion of the second ends of the resilient elements.

In case that the receptacle is inserted into the receptacle holder by means of a transporting unit such as a mechanical gripper, the receptacle holder and the gripper can be aligned less precise due to the sliding motion of the second ends of the resilient elements. Reduction of the precision requirement may also lead to a decreased required insertion time interval. Subsequent to inserting the receptacle into the receptacle holder, the resilient elements of the receptacle holder self-center the receptacle in the receptacle holder. Thus, the receptacle is precisely positioned relative to the transporting unit for removal of the receptacle from the receptacle holder at a later stage.

Further, receptacles having different dimensions can be inserted into the receptacle holder. In other words, the receptacle holder is not designed to support a specific kind of receptacle, but to support a variety of different receptacles. According to certain embodiments, accommodation of differently sized receptacles can be enabled due to providing resilient elements being formed of e.g. metal band and due to providing an additional degree of freedom of the motion of each resilient element. According to a certain embodiment, receptacles having a diameter between 12-16 mm can be supported by a receptacle holder without making any modifications to the receptacle holder, for instance.

Additionally, the resilient elements are detachably connected with the first perimeter wall of the receptacle holder. Thus, it is possible to quickly replace a resilient element by another resilient element, for example in case that one of the resilient elements is damaged or in case that the receptacle holder has to be adapted for another receptacle having other dimensions. According to certain embodiments, the receptacle holder can be adapted to support receptacles having a diameter between 7-20 mm by replacing the resilient elements, i.e. by making minor modifications, for instance.

Certain embodiments of the present invention provide a receptacle rack which is designed to hold at least one receptacle in an upright position and to be used in an automated laboratory system such as an automated storage. The receptacle comprises a plurality of the receptacle holders according to certain other embodiments of the present invention. Therefore, the advantages previously mentioned in connection with the receptacle holder also apply with regards to the receptacle rack.

EMBODIMENTS

Certain embodiments of the present invention provide a receptacle holder comprising a plurality of resilient elements, which are distributed about an axis of the receptacle holder and are detachably connected with a perimeter wall. Each resilient element comprises an end portion at an upper end, which rests hooked over an edge of a portion of the perimeter wall. The receptacle holder is configured to allow sliding of the end portion in a direction perpendicular to the axis and away from the perimeter wall. Consequently, the upper end of each resilient element provides an additional degree of freedom of the motion of the respective resilient element compared to a receptacle holder having fixed ends of the resilient elements.

Figure 1:
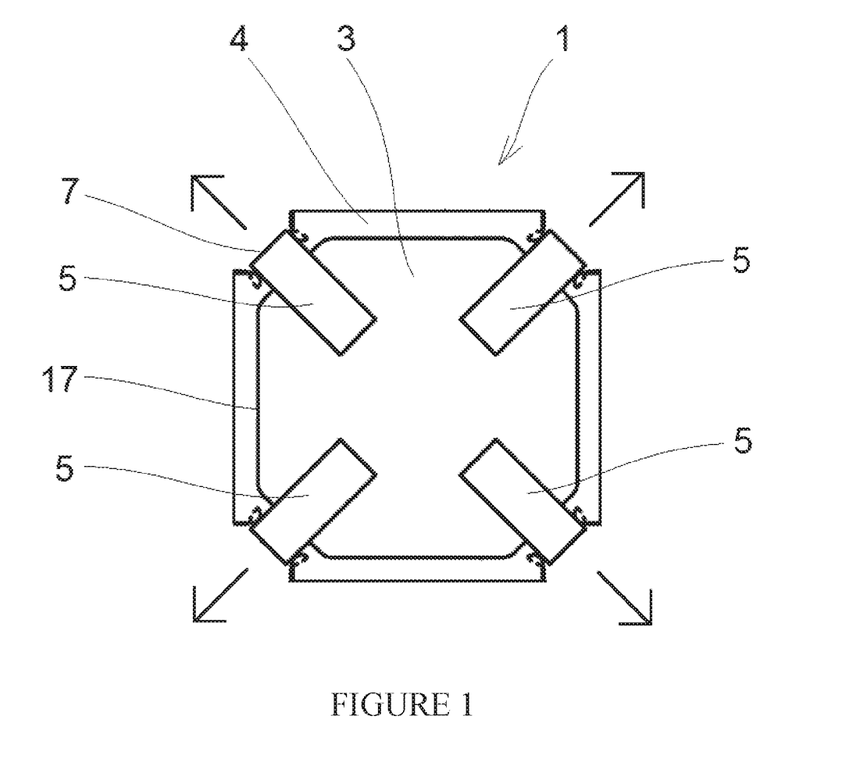
FIG. 1 illustrates a schematic top view of a receptacle holder in accordance with at least some embodiments of the present invention.

In FIG. 1 a schematic top view of a receptacle holder 1 in accordance with at least some embodiments of the present invention is illustrated. The receptacle holder 1 comprises a base body 3 and a first perimeter wall 4 which at least partially protrudes from the base body 3. The receptacle holder further comprises a plurality of resilient elements 5, which are distributed about a first axis $A_1$ of the receptacle holder 1 and are detachably connected with the first perimeter wall 4. Each resilient element 5 comprises a first end portion (not shown), i.e. a lower end portion, and a second end portion 7, i.e. an upper end portion. Each second end portion 7 rests hooked over an edge of a portion of the first perimeter wall 4. The receptacle holder 1 is configured to allow sliding of each second end portion 7 in a direction perpendicular to the first axis as indicated by the arrows.

The receptacle holder 1 is configured to allow sliding of each second end portion 7 in the direction perpendicular to the first axis responsive to an receptacle (not shown) being inserted into the receptacle holder 1. Examples of receptacles to be inserted are test tubes, sample tubes, or cuvettes. In particular, the receptacle holder 1 is configured to allow sliding of each second end portion 7 away from the first axis and away from the edge of the first perimeter wall 4. Secure insertion of the receptacle into the receptacle holder 1 can be improved due to the sliding motion of the second ends of the resilient elements 5. In case that the receptacle is inserted into the receptacle holder 1 by means of a transporting unit such as a mechanical gripper (not shown), the receptacle holder 1 and the gripper have to be aligned less precise due to the sliding motion of the second ends of the resilient elements 5. Reduction of the precision requirement may also lead to a decreased required insertion time interval.

The shown receptacle holder 1 comprises four resilient elements 5. The holder 1 is configured to self-center an inserted receptacle due to the four resilient elements 5. Thus, the receptacle is precisely positioned relative to the transporting unit for removal of the receptacle from the receptacle holder 1.

The first perimeter wall 4 provides a first octagonal opening 17. The first end portion of each resilient element 5 is arranged in a separate indentation (not shown) of the first perimeter wall 4. The first end portion 6 of each resilient element 5 is connected to the first perimeter wall 4 at a lower position and the second end portion 7 of each resilient element 5 is connected to the first perimeter wall 4 at an upper position.

Figure 2:
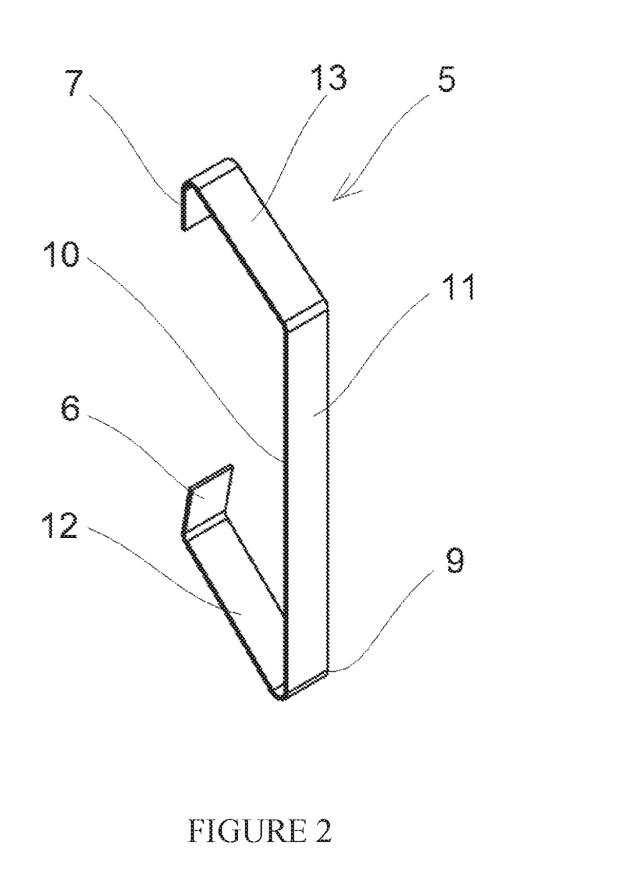
FIG. 2 illustrates a schematic perspective view of a resilient element of a receptacle holder in accordance with at least some embodiments of the present invention.

In FIG. 2 a schematic perspective view of a resilient element 5 of a receptacle holder 1 in accordance with at least some embodiments of the present invention is illustrated. The resilient element 5 may be, for example, formed of metal band 9. The resilient metal band 9 is bent to form a substantially C-shaped-member 10 having a base 11. The base 11 typically extends at least partially in parallel to the first axis when the resilient element is connected to the first perimeter wall (not shown). The C-shaped-member 10 comprises a first leg 12 extending from the base 11. The first end portion 6 in turn projects from the first leg 12. Additionally, the C-shaped-member 10 comprises a second leg 13 extending from the base 11. The second end portion 7 in turn projects from the second leg 13. The first leg 12 is arranged substantially parallel to the second leg 13. The resilient element 5 may be also produced by injection molding technology according to certain embodiments.

According to certain other embodiments, the base 11 may be bent to form at least two distinct contact portions for contacting an inserted receptacle 2.

Figure 3:
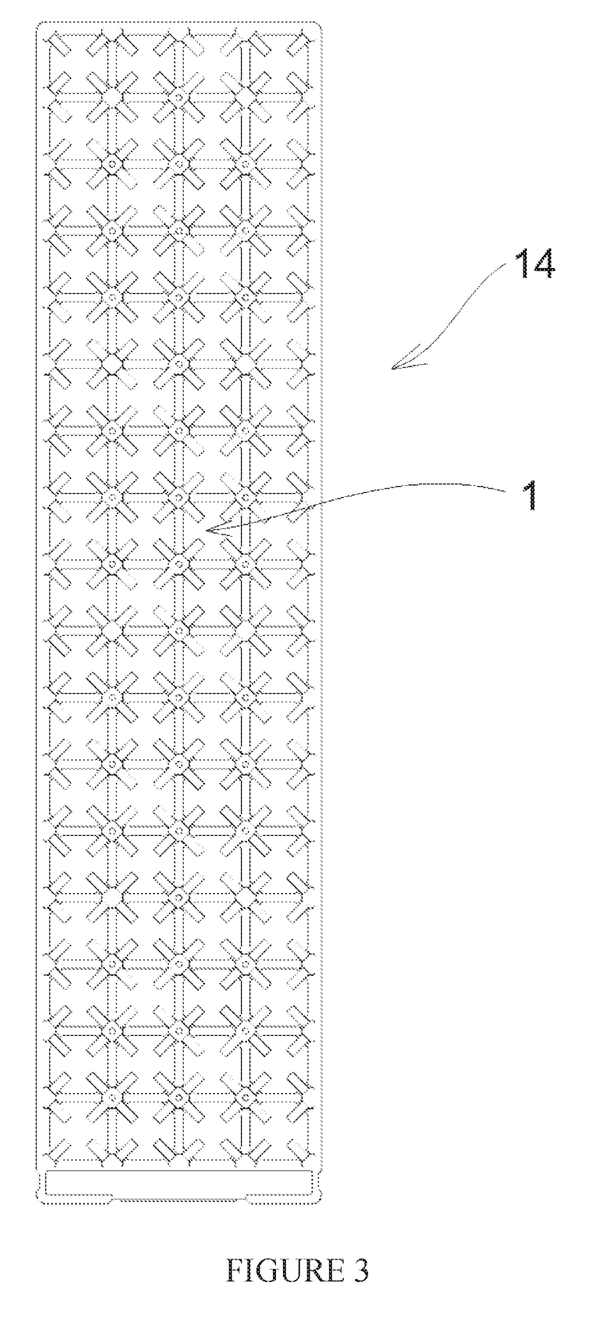
FIG. 3 illustrates a schematic top view of a receptacle rack comprising a plurality of receptacle holders in accordance with at least some embodiments of the present invention.

In FIG. 3 a schematic top view of a receptacle rack 14 comprising a plurality of receptacle holders 1 in accordance with at least some embodiments of the present invention is illustrated. The receptacle holders 1 are connected to each other such that a solid rack structure is formed. The solid rack structure may be, for example, formed by using injection molding technology. Only the resilient elements are detachably connected to the solid rack structure. The receptacle holders 1 of the rack 14 are arranged in lines and columns. In the shown example, the receptacle holders 1 of the rack 14 are arranged in 17 lines and 4 columns, thus providing 68 receptacle holders 1 in total. Of course, a rack according to certain other embodiments of the present invention may provide another integer number of lines and columns, thus providing another integer number of receptacle holders 1.

Figure 4:
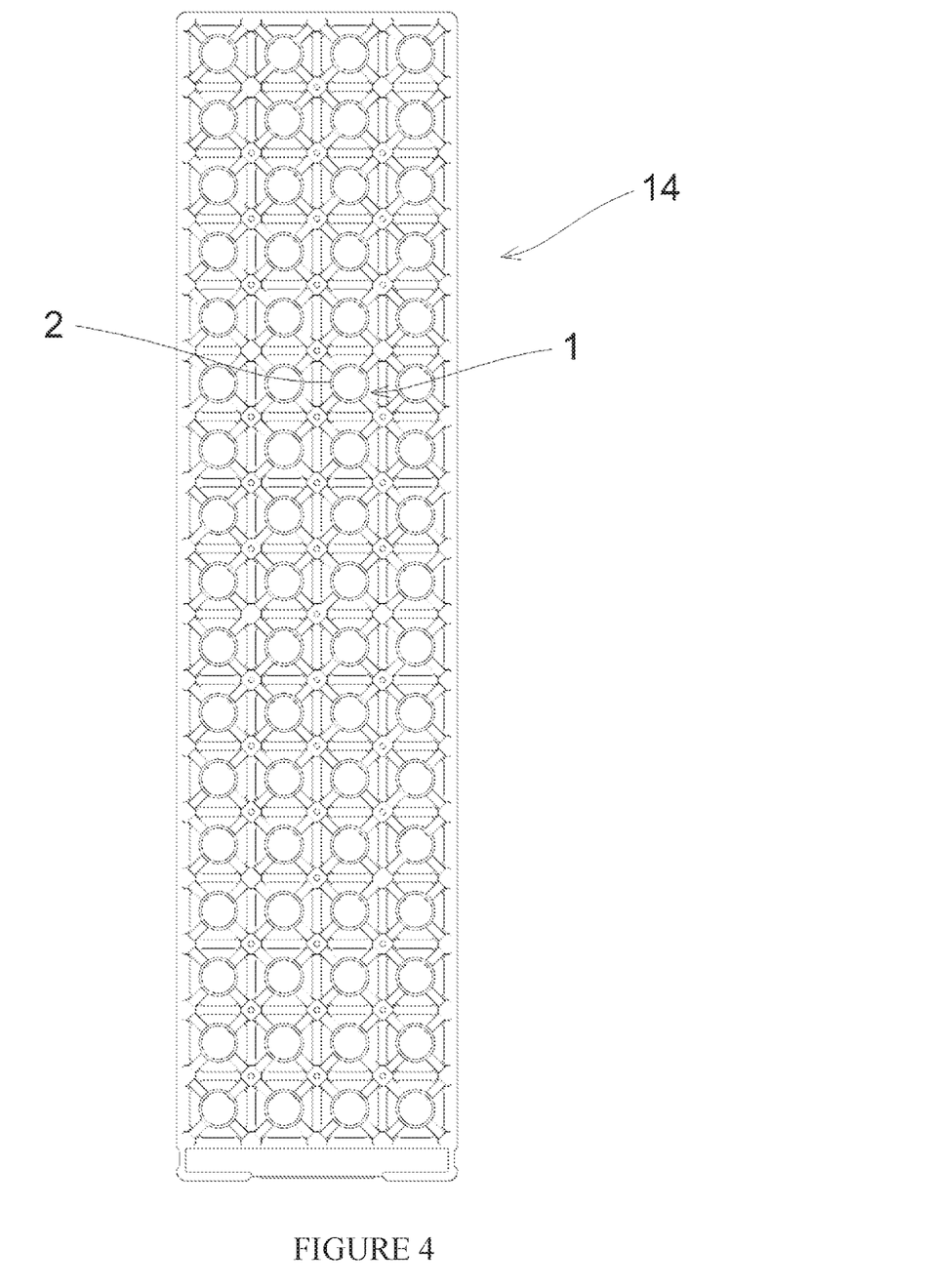
FIG. 4 illustrates a schematic top view of another receptacle rack comprising a plurality of receptacle holders in accordance with at least some embodiments of the present invention.

In FIG. 4 a schematic top view of another receptacle rack 14 comprising a plurality of receptacle holders 1 in accordance with at least some embodiments of the present invention is illustrated. Into each receptacle holder 1 of the receptacle rack 14 a respective receptacle 2 has been inserted.

Figure 5:
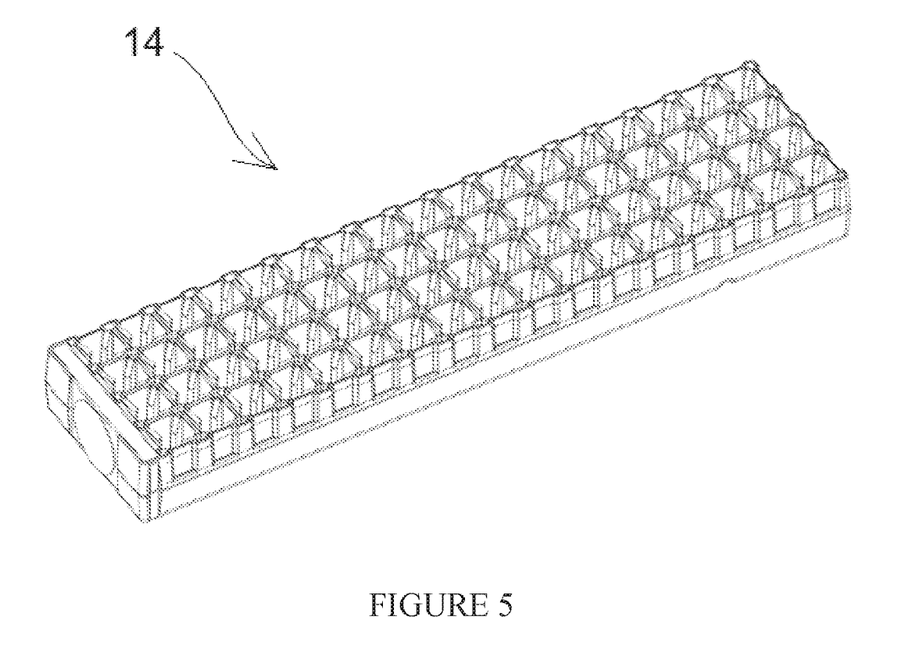
FIG. 5 illustrates a schematic perspective view of a receptacle rack comprising a plurality of receptacle holders in accordance with at least some embodiments of the present invention.

In FIG. 5 a schematic perspective view of a receptacle rack 14 comprising a plurality of receptacle holders 1 in accordance with at least some embodiments of the present invention is illustrated. The receptacle rack 14 is designed to hold at least one receptacle (not shown) in an upright position and to be used in an automated laboratory system such as an automated storage. For example, the receptacle rack 14 is designed to be transported between different stations of the automated laboratory system. For example, the receptacle rack may be transported by a transporting unit from a sample storage to another station of the automated laboratory system. Subsequently, receptacles may be removed from the receptacle rack for analyzing the target substance contained in each receptacle. Then each receptacle may be re-inserted into the receptacle rack 14 and the receptacle rack 14 may be transported to a disposal station in order to discharge some of the receptacles inserted into the receptacle rack. The remaining receptacles in the receptacle rack 14 may transported back to the sample storage subsequently.

A wide variety of automated laboratory systems are known in the art and widely used in hospitals, clinics, and research laboratories. A laboratory automation system typically comprises a number of stations, in which samples, for example blood, saliva, swap, and other target substances are processed. Examples of receptacles are sample tubes, test tubes, cuvettes, sample containers, sample vessels, or other elongate receptacles that are used for temporarily storing the target substance. The receptacles may be transported between at least two the stations of the automated laboratory system by means of receptacle racks.

Figure 6:
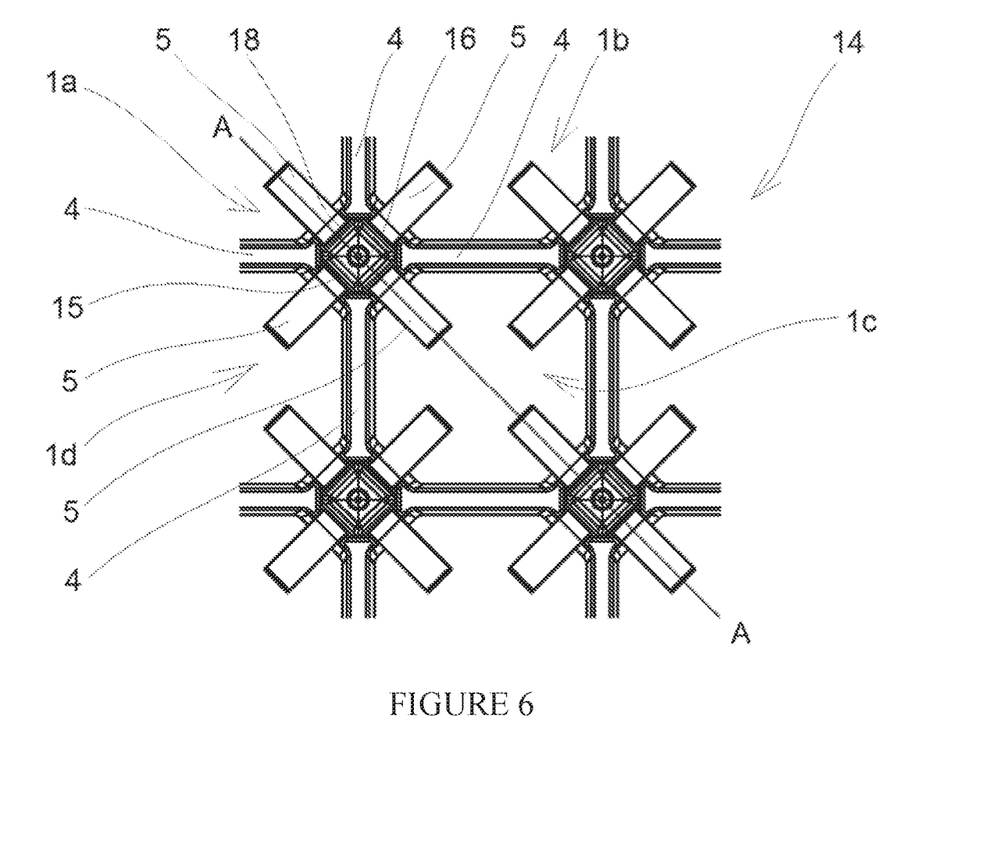
FIG. 6 illustrates a schematic top view of a portion of a receptacle rack comprising a plurality of receptacle holders in accordance with at least some embodiments of the present invention.

In FIG. 6 a schematic top view of a portion of a receptacle rack 14 comprising a plurality of receptacle holders 1 in accordance with at least some embodiments of the present invention is illustrated. In particular, one receptacle holder 1 is shown in the center of FIG. 6 and additionally eight receptacle holders 1 surrounding the receptacle holder 1 in the center are shown partially.

It can be further seen that the receptacle rack 14 comprises four adjoining receptacle holders 1a, 1b, 1c, 1d, which are arranged such that a second perimeter wall 15 is provided by portions of the first perimeter wall 4 of each of said four adjoining receptacle holders 1a, 1b, 1c, 1d. Thus, a cavity 16 having a second axis is provided between said four adjoining receptacle holders 1a, 1b, 1c, 1d. The second axis is arranged parallel to the first axis.

The receptacle rack 14 is configured to allow sliding of the second end portion 7 of one resilient element 5 of each of said four adjoining receptacle holders 1a, 1b, 1c, 1d in the direction perpendicular to the second axis responsive to receptacles 2 being inserted into each of said four adjoining receptacle holders 1a, 1b, 1c, 1d. In other words, the receptacle rack 14 is configured to allow sliding of the second end portion 7 of one resilient element 5 of each of said four adjoining receptacle holders 1a, 1b, 1c, 1d towards the second axis and inwardly of the second perimeter wall 15, i.e. one resilient element 5 of each of said four adjoining receptacle holders 1a, 1b, 1c, 1d is capable of moving within the cavity 16. The second perimeter wall provides a second octagonal opening 18.

Figure 7:
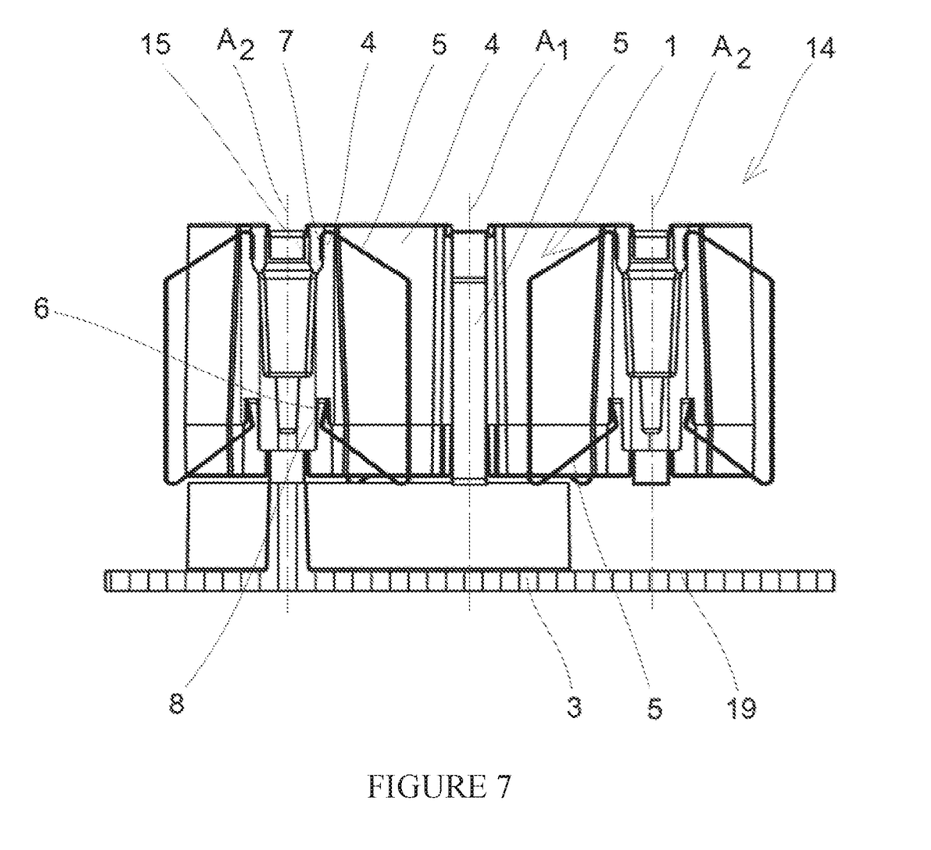
FIG. 7 illustrates a schematic cross-sectional view of a portion of a receptacle rack comprising a plurality of receptacle holders in accordance with at least some embodiments of the present invention.
Figure 8:
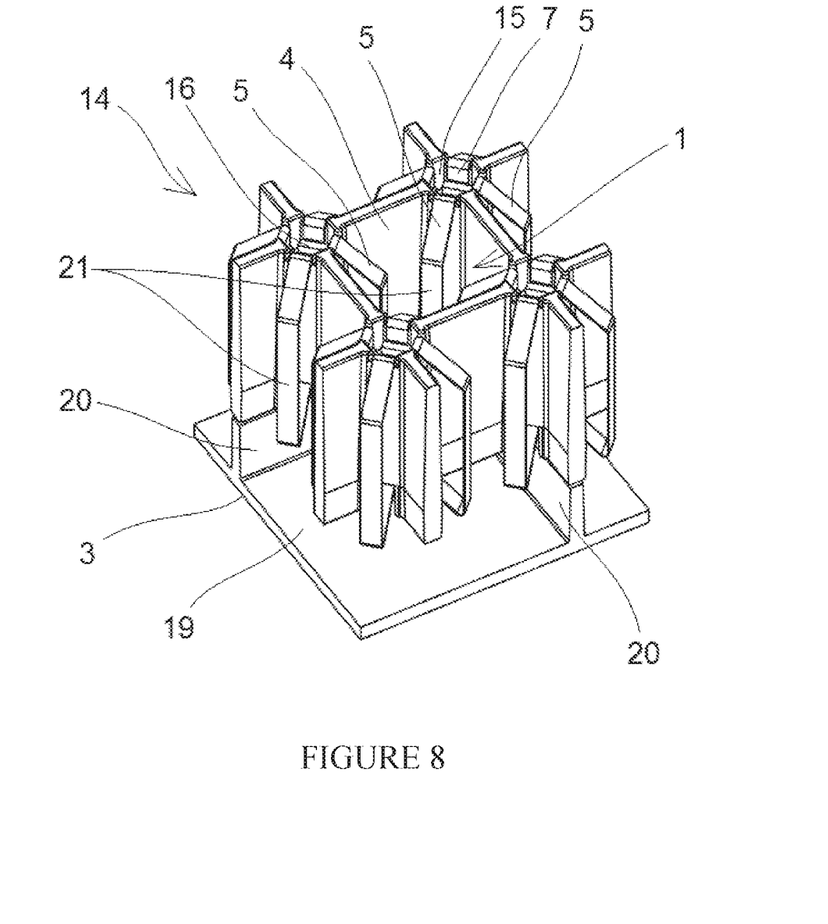
FIG. 8 illustrates a schematic perspective view of a portion of a receptacle rack comprising a plurality of receptacle holders in accordance with at least some embodiments of the present invention.

In FIG. 7 a schematic cross-sectional view of a portion of a receptacle rack 14 comprising a plurality of receptacle holders 1 in accordance with at least some embodiments of the present invention is illustrated. The cross section along line A-A shown in FIG. 6 is illustrated. The receptacle holder 1 comprises a base body 3 and a first perimeter wall 4 which protrudes or partially protrudes from the base body 3 in a direction perpendicular to the base body 3. The words "partially protrudes" mean that a (small) protrusion protrudes from the base body 3 in a direction perpendicular to the base body 3 from which (small) protrusion the first perimeter wall 4 further protrudes in a direction perpendicular to the base body 3. In other words, there may be a gap between the base body 3 and a part of the first perimeter wall 4 (s. FIG. 8). The receptacle holder further comprises a plurality of resilient elements 5, which are distributed about a first axis $A_1$ of the receptacle holder 1 and are detachably connected with the first perimeter wall 4.

Each resilient element 5 comprises a first end portion (not shown) and a second end portion 7. Each first end portion 6 is arranged in a separate indentation 8 or recess of the first perimeter wall 4. Each second end portion 7 rests hooked over an edge of a portion of the first perimeter wall 4. The receptacle holder 1 is configured to allow sliding of each second end portion 7 in a direction perpendicular to the first axis $A_1$. In particular, the receptacle holder 1 is configured to allow sliding of each second end portion 7 in the direction perpendicular to the first axis $A_1$ away from the first axis $A_1$ and away from the edge of the first perimeter wall 4 responsive to an receptacle (not shown) being inserted into the receptacle holder 1.

Further, the receptacle rack 14 is configured to allow sliding of the second end portion 7 of one resilient element 5 of each of four adjoining receptacle holders towards the second axis $A_2$ and inwardly of the second perimeter wall 15.

The first axis $A_1$ and the second axis $A_2$ are both orientated perpendicular to a bottom 19 of the base body 3.

FIG. 8 a schematic perspective view of a portion of a receptacle rack 14 comprising a plurality of receptacle holders 1 in accordance with at least some embodiments of the present invention is illustrated. The receptacle holder 1 of the rack 14 comprises a base body 3 having bottom 19 and a perimeter wall 4 partially protruding from the base body 3. The base body 3 further comprises a plurality of ribs 20. The footprint formed by the inside walls of the perimeter wall 4 is octagonal. In other words, the inside of the perimeter wall 4 is formed by a first wall, a second wall, a third wall, and a fourth wall as well as a fifth wall, a sixth wall, a seventh wall, and an eighth wall. The first, second, third, and fourth walls form a first group of walls and are of identical length and height. Further, the fifth, the sixth, the seventh, and the eighth wall form a second group of walls and are also of identical length and height. The length of the walls of the first group of walls is greater than the length of the walls of the second group of walls. The height of the walls of the first group of walls and the height of the walls of the second group of walls is identical. The bottom 19 and the perimeter wall 4 form a cavity for supporting a receptacle.

The first end portion of each resilient element 5 is arranged in a separate indentation or recess (not shown) in the first perimeter wall 4. Each indentation or recess is arranged in one of the four walls of the second group of walls. Each second end portion 7 rests hooked over an edge of a portion of the first perimeter wall 4, i.e. over one of the four walls of the second group of walls. Each of the resilient elements 5 further comprises at least one holding surface 21 which is configured to be brought into contact with a surface of a receptacle (not shown).

Figure 9:
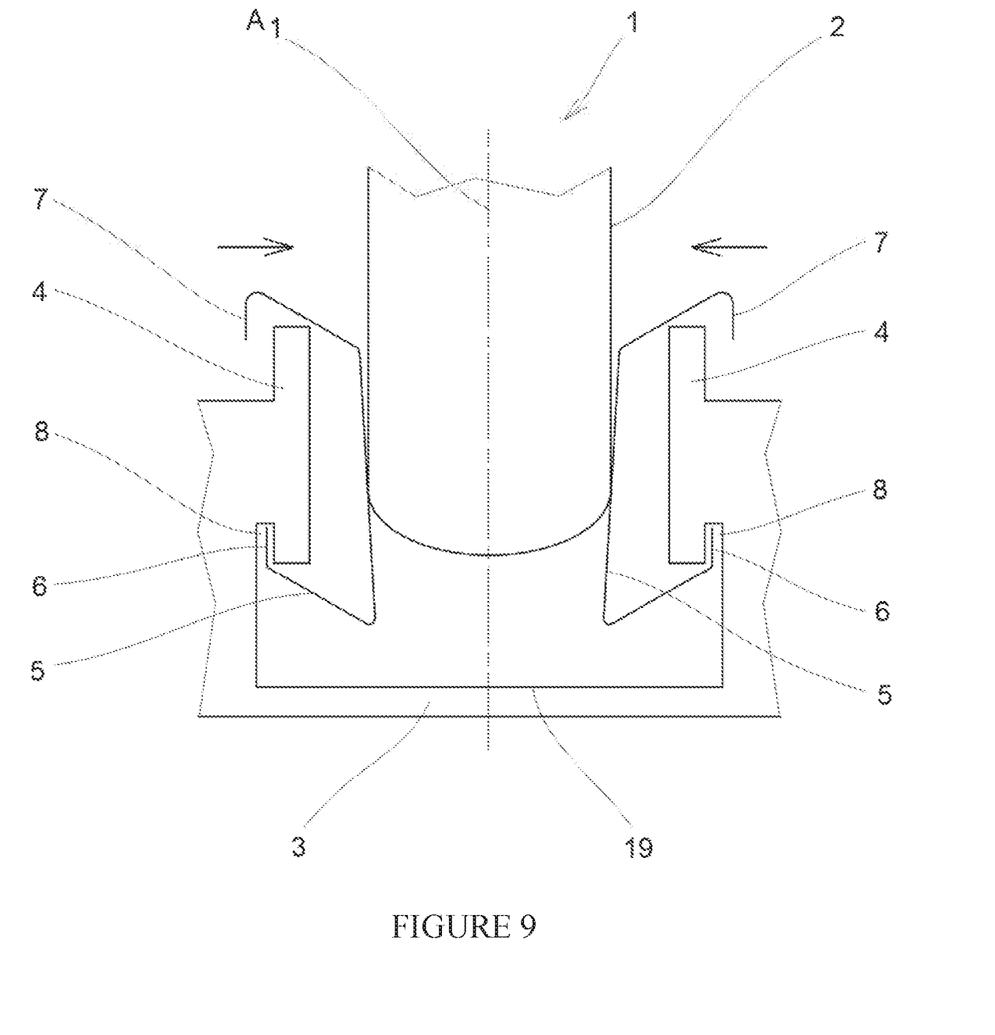
FIG. 9 illustrates a schematic cross-sectional view of a portion of a receptacle holder of a receptacle rack in accordance with at least some embodiments of the present invention.

In FIG. 9 a schematic cross-sectional view of a receptacle holder 1 of a receptacle rack in accordance with at least some embodiments of the present invention is illustrated. A removal situation of a receptacle 2 being removed from the receptacle holder 1 is shown. When removing the receptacle 2 from the receptacle holder 1, the second end 7 of each resilient element 5 can slide in a direction perpendicular to the first axis $A_1$ towards the first axis $A_1$. Each second end portion 7 rests hooked over an edge of a portion of the first perimeter wall 4 as the receptacle 2 has been completely removed from the receptacle holder 1. The first end portion 6 of each resilient element 5 is arranged in a separate indentation 8 of the first perimeter wall 4.

Consequently, the receptacle rack is configured to allow sliding of the second end portion 7 of one resilient element 5 of each of four adjoining receptacle holders in a direction perpendicular to the second axis (not shown) responsive to receptacles 2 being removed from each of four adjoining receptacle holders. The receptacle rack is configured to allow sliding of the second end portion 7 of one resilient element 5 of each of four adjoining receptacle holders away from the second axis and towards the second perimeter wall.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in an automated laboratory system or a part thereof.

REFERENCE SIGNS LIST 1 receptacle holder
1a, 1b, 1c, 1d adjoining receptacle holders
2 receptacle
3 base body
4 first perimeter wall
5 resilient element
6 first end portion
7 second end portion
8 indentation
9 metal band
10 C-shaped member
11 base
12 first leg
13 second leg
14 rack
15 second perimeter wall
16 cavity
17 first octagonal opening
18 second octagonal opening
19 bottom
20 rib
21 holding surface
$A_1$ first axis
$A_2$ second axis

CITATION LIST

Patent Literature

U.S. Pat. No. 5,651,941 A
EP 3093071 A1

The invention claimed is:

1. A receptacle rack comprising a plurality of receptacle holders, the receptacle holders each comprising:
   a base body,
   a first perimeter wall which at least partially protrudes from the base body, wherein the first perimeter wall provides a first octagonal opening, and a plurality of resilient elements, which are distributed about a first axis of the receptacle holder and are detachably connected with the first perimeter wall, and wherein each resilient element comprises a lower end portion and an upper end portion, and wherein each upper end portion rests hooked over an edge of a portion of the first perimeter wall, and wherein the receptacle holder is configured to allow sliding of each upper end portion in a direction perpendicular to the first axis, and wherein each lower end portion is arranged in a separate indentation of the first perimeter wall
   wherein the receptacle rack comprises four adjoining receptacle holders, which are arranged such that a second perimeter wall is provided by portions of the first perimeter wall of each of said four adjoining receptacle holders.

2. The receptacle rack according to claim 1, wherein a cavity having a second axis is provided between said four adjoining receptacle holders.

3. The receptacle rack according to claim 2, wherein the second axis is arranged parallel to the first axis.

4. The receptacle rack according to claim 2, wherein the receptacle rack is configured to allow sliding of the upper end portion of one resilient element of each of said four adjoining receptacle holders in a direction perpendicular to the second axis responsive to receptacles being inserted into each of said four adjoining receptacle holders.

5. The receptacle rack according to claim 4, wherein the receptacle rack is configured to allow sliding of the upper end portion of one resilient element of each of said four adjoining receptacle holders towards the second axis.

6. The receptacle rack according to claim 4, wherein the receptacle holder is configured to allow sliding of the upper end portion of one resilient element of each of said four adjoining receptacle holders inwardly of the second perimeter wall.

7. The receptacle rack according to claim 2, wherein the receptacle rack is configured to allow sliding of the upper end portion of one resilient element of each of said four adjoining receptacle holders in the direction perpendicular to the second axis responsive to receptacles being removed from each of said four adjoining receptacle holders.

8. The receptacle rack according to claim 7, wherein the receptacle rack is configured to allow sliding of the upper end portion of one resilient element of each of said four adjoining receptacle holders away from the second axis.

9. The receptacle rack according to claim 7, wherein the receptacle holder is configured to allow sliding of the upper end portion of one resilient element of each of said four adjoining receptacle holders towards the second perimeter wall.

10. The receptacle rack according to claim 1, wherein the second perimeter wall provides a second octagonal opening.

\* \* \* \* \*